US010091073B2

(12) United States Patent
Groves et al.

(10) Patent No.: US 10,091,073 B2
(45) Date of Patent: *Oct. 2, 2018

(54) LARGE-SCALE PASSIVE NETWORK MONITORING USING MULTIPLE TIERS OF ORDINARY NETWORK SWITCHES

(71) Applicant: Microsoft Technology Licensing, LLC, Redmond, WA (US)

(72) Inventors: Vernon Richard Groves, Duvall, WA (US); Justin W. Scott, Lake Stevens, WA (US); Dylan Greene, Brier, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 14 days.

This patent is subject to a terminal disclaimer.

(21) Appl. No.: 15/175,007

(22) Filed: Jun. 6, 2016

(65) Prior Publication Data
US 2016/0285705 A1    Sep. 29, 2016

Related U.S. Application Data

(63) Continuation of application No. 13/494,010, filed on Jun. 11, 2012, now Pat. No. 9,363,152.

(51) Int. Cl.
*H04L 12/26* (2006.01)
*H04L 12/46* (2006.01)
*H04L 29/06* (2006.01)

(52) U.S. Cl.
CPC ........ *H04L 43/026* (2013.01); *H04L 12/4625* (2013.01); *H04L 43/062* (2013.01); *H04L 43/12* (2013.01); *H04L 69/16* (2013.01)

(58) Field of Classification Search
None
See application file for complete search history.

(56) References Cited

U.S. PATENT DOCUMENTS 9,363,152 B2 *    6/2016    Groves ................ H04L 43/026
2011/0080855 A1    4/2011    Fung
(Continued)

FOREIGN PATENT DOCUMENTS

WO    2011043416 A1    4/2011

OTHER PUBLICATIONS

Farrington, et al., "Data Center Switch Architecture in the Age of Merchant Silicon", In Proceedings of 17th IEEE Symposium on High Performance Interconnects, Aug. 25, 2009, 10 Pages.
(Continued)

*Primary Examiner* — Mohammad Sajid Adhami
(74) *Attorney, Agent, or Firm* — The Watson I.P. Group, PLC; Vladan M. Vasiljevic

(57) ABSTRACT

Passive monitoring of a large-scale network using multiple tiers of ordinary network switches, as opposed to purpose-built network monitoring hardware, is accomplished by initially providing network communications to an initial tier of monitoring switches, either from existing switches that copy frames and provide them to the monitoring switches, or from network taps to which the monitoring switches are connected. The initial tier of monitoring switches comprises flow tables that initially simply drop all frames provided to those switches and, subsequently, when specific network issues arise, they are modified to include a specification particular frame criteria whose frames are either forwarded to subsequent tiers of monitoring switches, or statistics regarding those frames are collected. Subsequent tiers of monitoring switches receive frames from the initial tier and direct them to one or more appropriate analysis computing devices. Ordinary network switches are selected based on their ability to provide low latency forwarding.

20 Claims, 5 Drawing Sheets

(56) References Cited

U.S. PATENT DOCUMENTS

| | | |
|---|---|---|
| 2011/0271007 A1 | 11/2011 | Wang et al. |
| 2012/0008629 A1 | 1/2012 | Chiba et al. |
| 2012/0093158 A1 | 4/2012 | Chiba |
| 2012/0113989 A1 | 5/2012 | Akiyoshi et al. |
| 2012/0130950 A1* | 5/2012 | Jain .................. G06F 17/30212 707/634 |
| 2012/0195318 A1 | 8/2012 | Numata et al. |
| 2013/0064243 A1* | 3/2013 | Akiyoshi ................ H04L 45/38 370/389 |
| 2013/0272135 A1* | 10/2013 | Leong ................ H04L 41/0823 370/241 |
| 2013/0322257 A1* | 12/2013 | Shimonishi ......... H04L 41/0893 370/236 |
| 2014/0331280 A1* | 11/2014 | Porras .................... H04L 63/20 726/1 |

OTHER PUBLICATIONS

Fratto, Mike, "IBM and NEC Leverage Open Flow for High-Performance Networking", Retrieved from <<http://www.networkcomputing.com/next-gen-network-tech-center/232500326?prin>>, Jan. 24, 2012, 10 Pages.

Hedlund, Brad, "On Data Center Scale, Open Flow, and SDN", Retrieved from <<http://bradhedlund.com/2011/04/21/data-center-scale-openflow-sdn/>>, Apr. 21, 2011, 13 Pages.

Lee, Gary, "The Fulcrum Acquisition is Complete", Retrieved from <<https://web.archive.org/web/20120807110518/http://www.fulcrummicro.com/blog/?p=887>>, Aug. 7, 2012, 3 Pages.

Lu, et al., "ServerSwitch: A Programmable and High Performance Platform for Data Center Networks", In Proceedings of the 8th USENIX Conference on Networked Systems Design and Implementation, Mar. 30, 2011, 14 Pages.

Mogul, et al., "DevoFlow: Cost-Effective Flow Management for High Performance Enterprise Networks", In Proceedings of the 9th ACM SIGCOMM Workshop on Hot Topics in Networks, Oct. 20, 2010, 6 Pages.

Wang, et al., "Open Flow-Based Server Load Balancing Gone Wild", In Proceedings of the 11th USENIX Conference on Hot Topics in Management of Internet, Cloud, and Enterprise Networks and Services, Mar. 29, 2011, 6 Pages.

Weckel, Alan, "Cloud to Disrupt Ethernet Switch Space", Retrieved from <<http://www.eetasia.com/ART_8800655768_590626_NT_42f5d9c8.htm>>, Nov. 16, 2011, 3 Pages.

* cited by examiner

LARGE-SCALE PASSIVE NETWORK MONITORING USING MULTIPLE TIERS OF ORDINARY NETWORK SWITCHES

CROSS REFERENCE TO RELATED APPLICATION

This application is a continuation of, and claims priority from, U.S. patent application Ser. No. 13/494,010—now U.S. Pat. No. 9,363,152—filed Jun. 11, 2012 and entitled "Large Scale Passive Network Monitoring Using Multiple Tiers Of Ordinary Network Switches", the entire specification of which is hereby incorporated by reference.

BACKGROUND

Increasingly, the utility of computing devices lies in their ability to communicate with one another. For example, users of computing devices traditionally used to utilize computing devices for content creation, such as the creation of textual documents or graphical images. Increasingly, however, the most popular utilizations of computing devices are in the browsing of information sourced from other computing devices, the interaction with other users of other computing devices, and other such utilizations that rely on the ability of computing devices to communicate with one another. Consequently, being able to monitor the network communications between two or more computing devices becomes increasingly important. Such monitoring can be utilized to resolve network communication issues, such as the failure of communications to reach their intended target, the failure of communications to be efficiently routed between two or more computing devices, and other like network communication anomalies.

When attempting to resolve network communication issues, it can be important that data being transmitted among a network of computing devices is provided to analysis mechanisms in an unchanged manner. For example, frames of data, representing any sort of data packetization for network communication can be provided to analysis mechanisms in the same manner in which those frames are communicated amongst the computing devices of the network. Unfortunately, were traditional networking hardware utilized to redirect or copy frames of data to analysis mechanisms, such traditional networking hardware would modify such frames by, for example, changing relevant portions of the headers of such frames to direct the frames to the analysis mechanisms instead of, for example, their intended target. Such modification can hide the source of network communication issues, rendering such issues far more difficult to identify and resolve.

To ensure that frames of data being communicated between computing devices of a network are provided to analysis mechanisms in an unchanged manner, customized networking hardware has typically been utilized. Such customized networking hardware can be prohibitively expensive, especially when designed to accommodate the volume of data typically exchanged by computing devices in an intensive network environment, such as a data center. Furthermore, because such networking hardware is customized for these specific applications, economies of scale do not operate to reduce the cost of such customized networking hardware over time. Consequently, while "ordinary" networking hardware, such as the networking hardware that can be purchased by consumers and small businesses, continues to provide ever-increasing performance for a modest cost, the customized networking hardware referenced above remains orders of magnitude more expensive.

SUMMARY

In one embodiment, ordinary network switches can be utilized to provide passive network monitoring of even large-scale networks. Such ordinary network switches can be conceptually organized into multiple tiers with an initial tier receiving frames of data from the network and identifying specific ones of them, and subsequent tiers receiving the identified frames from the initial tier and then directing them to appropriate analysis computing devices.

In another embodiment, the network switches of the initial tier can comprise flow tables that can identify specific frames that are to be subsequently processed by the network switches, including providing such specified frames to subsequent tiers of network switches. Similarly, the network switches of subsequent tiers can comprise flow tables that can redirect specific frames to appropriate analysis computing devices, including sending the frames captured by more than one initial tier switch to a single analysis computing device and sending the frames captured by one initial tier switch to multiple analysis computing devices.

In yet another embodiment, the flow tables can implement a loop topology, whereby identified frames can be redirected back to the same device or to other devices at a same, or preceding, tier to be processed by the tiers of network switches a subsequent time.

In a further embodiment, the flow tables of the ordinary network switches can comprise entries of different priority levels, such that processing according to an entry having a higher priority level is performed before processing according to an entry having a lower priority level. The flow tables of the network switches in the initial tier can comprise a low priority level entry that can specify a dropping of all frames received by such network switches, thereby avoiding inundating the analysis network with irrelevant frames. To the extent that specific frames are desired for further analysis, entries having higher priority levels can identify those frames, and either instruct that such frames be provided to network switches of the subsequent tiers, or can still drop such frames, except that statistics regarding such frames can be maintained for subsequent analysis.

In a still further embodiment, the initial tier of network switches can receive the frames from an existing network switch that can accurately copy such frames and provide them to one of the initial tier switches. Optionally, the routing of data within the network can be modified to ensure that the data is routed through a switch providing such copying functionality.

In a yet further embodiment, the ordinary network switches can be selected based on their implementation of known control protocols and based on defined hardware attributes, such as the utilization of a single processing unit, or other like hardware attributes that can result in the switch introducing a minimum of latency, data loss, and other undesirable effects.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
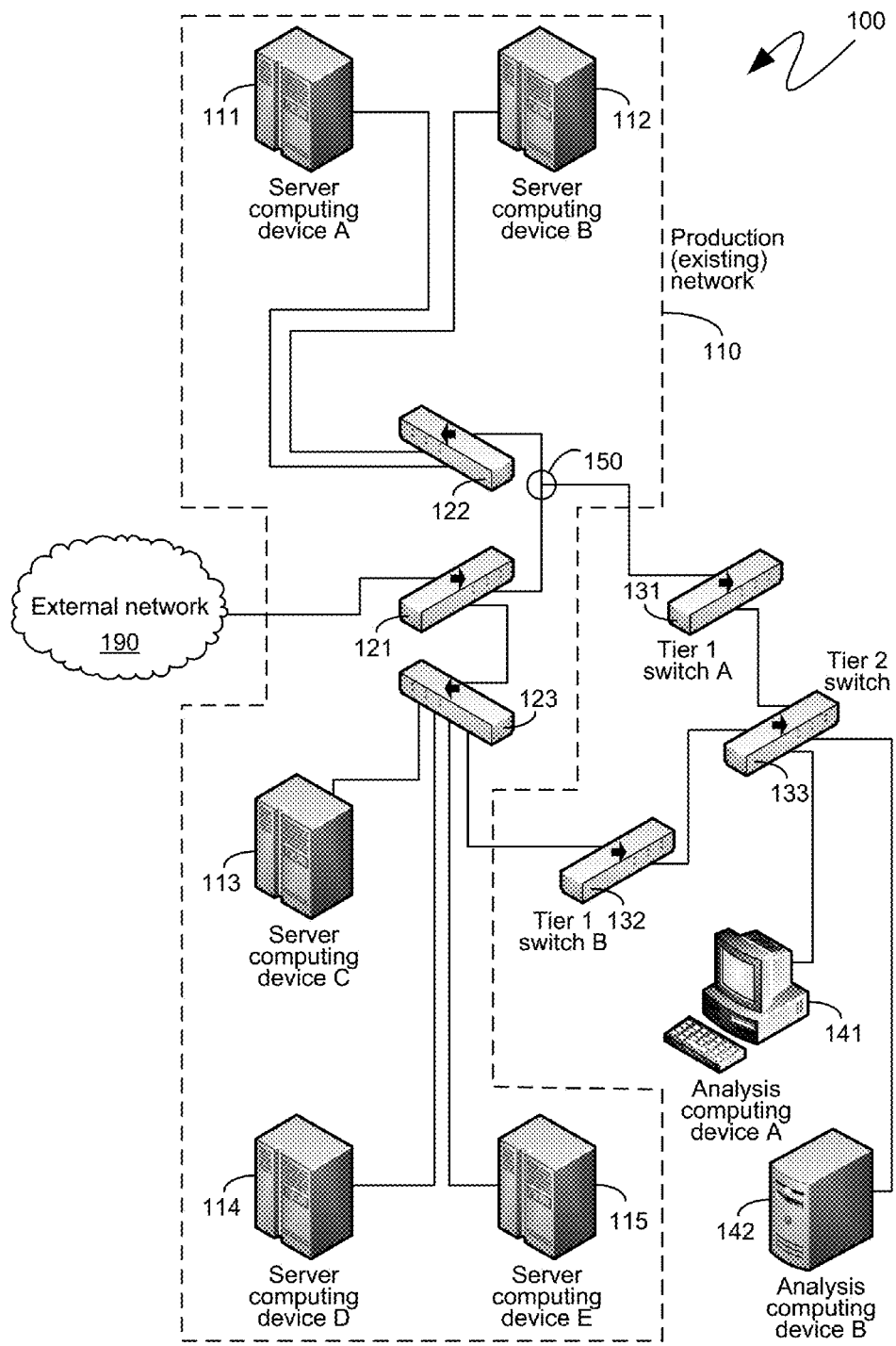
FIG. 1 is a component diagram of an exemplary network comprising an analysis network of ordinary switches.

The following description relates to the passive monitoring of a large-scale network using multiple tiers of ordinary network switches, as opposed to purpose-built network monitoring hardware, which can be orders of magnitude more expensive than the system described herein. Existing network switches can be utilized to generate a copy of the frames passing through them, and can provide that copy to an initial tier of monitoring switches. If possible, network communications can be routed past such existing switches to enable such network communications to be copied and provided to the initial tier of monitoring switches. Alternatively a network tap can be utilized, and the initial tier of monitoring switches can be connected to such network taps. The initial tier of monitoring switches can comprise a flow table that can initially simply drop all frames provided to those switches. Subsequently, when specific network issues arise, the flow tables of the initial tier of monitoring switches can be modified to include a specification of attributes of frames in order to identify frames that are deemed to be relevant to the network issue, and frames having those attributes can either be forwarded by the initial tier of monitoring switches to one or more subsequent tiers of monitoring switches, or statistics regarding those frames can be maintained by the initial tier of monitoring switches. Subsequent tiers of monitoring switches can receive frames from the initial tier of monitoring switches and can direct those frames to one or more appropriate analysis computing devices. To provide frames to one or more appropriate analysis computing devices in a meaningful manner, the monitoring switches can be selected from commercially available, and inexpensive, ordinary network switches that can provide low latency forwarding, such as by employing a single processing unit for the entire forwarding plane of the switch, and such as by utilizing content-addressable memory to implement the flow table.

The techniques described herein make reference to specific physical network connections between devices. Such references, however, are strictly exemplary and are made for ease of description and presentation, and are not intended to limit the mechanisms described to physical connections referenced. Instead, so long as the relevant network devices can communicate with one another in the manner described in detail below, the exact manner by which such devices are physically networked to one another is irrelevant. Additionally, the techniques described herein make reference to specific networking capabilities, including the utilization of specific hardware and software technologies. Again, however, such references are strictly exemplary and made for ease of description and presentation, and are not intended to limit the mechanisms described to the specific capabilities referenced.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional server computing racks or conventional personal computers, and include other computing configurations, including handheld devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary system 100 is illustrated, which comprises a network 110 of computing devices, such as the server computing devices 111, 112, 113, 114 and 115, and network switching and routing hardware, such as the network switches 121, 122 and 123. The network 110 can represent a large-scale network that would typically comprise thousands of computing devices and network switching and routing hardware though, for purposes of simplicity and understandability, only the server computing devices 111, 112, 113, 114 and 115 and the network switches 121, 122 and 123 are shown. A large-scale network, such as the exemplary network 110, is typically utilized for commercial, or production reasons. Consequently, for ease of reference, the exemplary network 110, comprising the existing network hardware that is to be passively monitored using multiple tiers of ordinary network switches, such as in the manner described in detail below, will be referred to herein as a "production network".

The exemplary production network 110, shown in the system 100 of FIG. 1, can communicate with an external network 190. For example, exemplary production network 110 can represent a server farm, data center, or other like production network whose services can be made available to users over the external network 190, which can, in turn, represent wide-scale networks such as, for example, the ubiquitous Internet. The network switching and routing hardware of the exemplary production network 110, such as the switches 121, 122 and 123 are illustrated with arrows to represent the input and output ports of such switches. Thus, for example, as illustrated by the arrow of the switch 121, the connection to the external network 190 can be received at an input port of the switch 121 and connections to other switches of the exemplary production network 110, such as the switches 122 and 123, can be made from the output ports of the switch 121. As will be recognized by those skilled in the art, the designations "input" and "output" are merely according to convention and are not intended to signify unidirectional communications since, as will be recognized by those skilled in the art, network switching and routing hardware typically provides for bidirectional communication. Additionally, as utilized herein, the term "switch" means any hardware or software component that can accept network communications at one port and redirect them to one or more other ports. Consequently, as utilized herein, the term "switch" encompasses not only hardware devices that perform switching functionality exclusively, but also includes hardware devices that perform routing, bridging and hub functionality.

In one embodiment, multiple tiers of ordinary network switches can be communicationally coupled to the production network 110 to enable passive monitoring of such a large-scale network. As utilized herein, the term "ordinary network switch" means a "switch", as defined above, that was not designed specifically for passive network monitoring, but is, instead, a general network component. The communicational coupling between the multiple tiers of ordinary network switches and a production network, such as the exemplary production network 110, can be of a sort that can provide, to a preliminary tier of the ordinary network switches, a copy of the frames of packetized data that comprise the network communications of the production network 110. In one embodiment, one or more switches of the production network 110, such as, for example, the exemplary switch 123, can be modified to transmit a copy of the frames passing through such a switch to one or more ordinary switches that will be utilized for the passive monitoring. Thus, as illustrated in the exemplary system 100 of FIG. 1, the switch 123 of the production network 110 can be connected to a switch 132 that can be one of an initial tier of switches that can be utilized for passive monitoring of the production network 110, and, more particularly the connection between the switch 123 and the switch 132 can be such that the network communications flowing through the switch 123, such as, for example, the network communications to and from the server computing devices 113, 114 115, can be copied, by the switch 123, and also provided to the switch 132 in unmodified form. As utilized herein the term "unmodified form" means that the frames, of which the network communications are comprised, are provided without modifying the headers and data of such frames in order to facilitate the provision thereof.

In one embodiment, if the production network 110 utilizes dynamic routing protocols, network communication traffic can be routed through the switch 123 in order to have the switch 123 provide a copy of as much of the network traffic of the production network 110 to the switch 132 as possible. For purposes of simplicity of illustration and description, the exemplary system 100 of FIG. 1 illustrates only a single switch 123 providing a copy to a single switch 132. Nevertheless, as will be understood by those skilled in the art, in a large-scale production network many switches analogous to the switch 123 can be modified to provide a copy of the frames passing therethrough to many other switches that can comprise an initial tier of the ordinary switches that will enable the passive network monitoring described in detail below. Typically, the provision of copied frames from a switch, such as the switch 123, that is part of the existing production network 110, to a switch 132 will be performed in such a manner that the switch 132 receiving such copied frames will be physically proximate to the switch 123 to minimize latency and other delays.

In another embodiment, rather than modifying one or more switches in an existing production network, such as the exemplary production network 110, a network tap, such as the exemplary network tap 150, can be utilized to provide a copy, to another switch, of the frames being provided to a switch, such as the switch 122. For example, the network tap 150 can provide such a copy of the frames to the switch 131, which can be part of an initial tier of the switches that will provide the passive network monitoring described in detail below. In addition to providing copies of frames, a network tap, such as the exemplary network tap 150, can also provide unframed data, data that was framed, but was framed incorrectly, non-Ethernet data and the like. In fact, as will be recognized by those skilled in the art, the provision of such other data can be an advantage to utilizing a network tap. As will also be recognized by those skilled in the art, network taps, such as the network tap 150, can comprise electromagnetic taps and optical taps that can physically generate a physical copy of the electromagnetic waves or optical signals passing through the network connection that is tapped. Thus, for example, in the illustrated example of FIG. 1, the network tap 150 can provide a copy, to the switch 131, of all the frames being provided to the switch 122 from the switch 121. As in the case of the switch 132, the switch 131 can comprise an initial tier of the ordinary switches that will be utilized to provide the passive network monitoring described in detail below.

Such an initial tier of switches can be communicationally coupled to one or more subsequent tiers of switches, such as the switch 133 shown in the exemplary system 100 of FIG. 1. Such subsequent tiers of switches can then be communicationally coupled to one or more analysis computing devices, such as the exemplary analysis computing devices 141 and 142 shown in the exemplary system 100 of FIG. 1. The analysis computing devices can include a user workstation, such as the analysis computing device 141, which can provide an interface to a human user and enable the human user to interact with the multiple tiers of the ordinary switches providing passive network monitoring of the production network 110. The analysis computing devices can also include server workstations or the like, such as the analysis computing device 142, which can host automated processes that can interact with the multiple tiers of the ordinary network switches providing the passive network monitoring in an automated manner. Again, for purposes of simplicity and understandability of illustration and description, the above-referenced one or more subsequent tiers of switches are represented by the single switch 133 in the exemplary system 100 of FIG. 1. However, as will be recognized by those skilled in the art, such one or more subsequent tiers of switches can comprise tens or even hundreds of switches depending on the quantity of the initial tier switches, such as the exemplary switches 131 and 132, and depending upon the scale of the production network being passively monitored.

Figure 2:
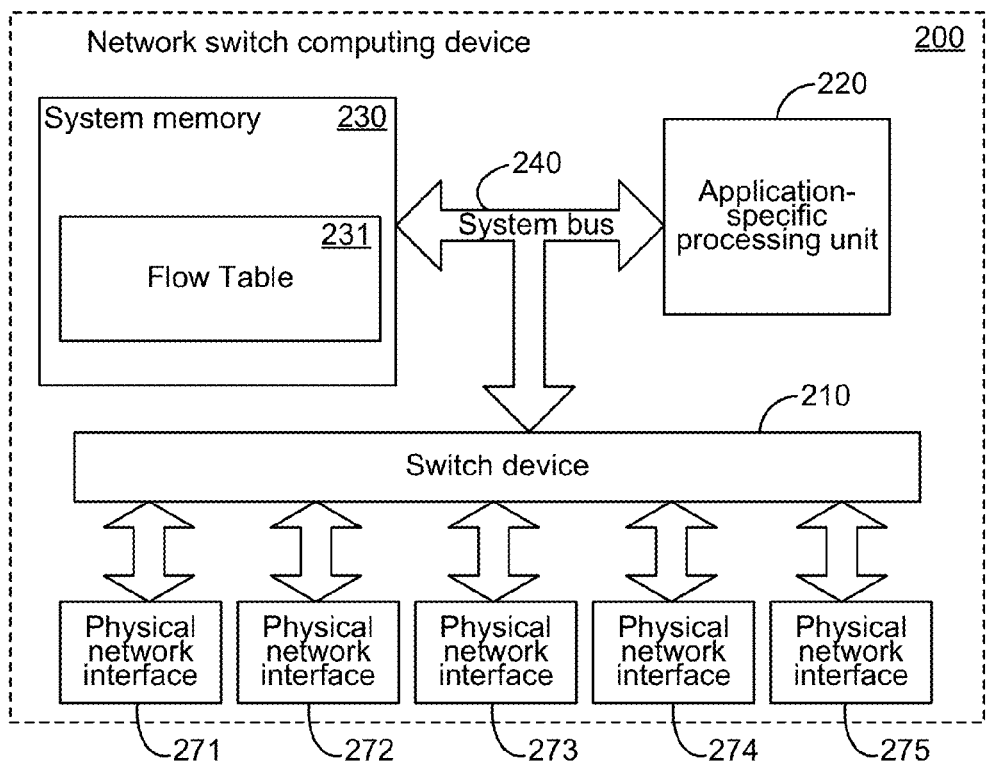
FIG. 2 is a block diagram illustrating an exemplary network switch computing device.

Before proceeding with a detailed description of the passive network monitoring provided by the multiple tiers of ordinary switches, such as that illustrated in the exemplary system 100 of FIG. 1, a more detailed description is provided of the switches and computing devices themselves, such as those shown in the exemplary system 100 of FIG. 1. Turning to FIG. 2, an exemplary network switch computing device 200 is illustrated. As shown, the exemplary network switch computing device 200 can comprise multiple physical network interfaces, such as the physical network interfaces 271, 272, 273, 274 and 275, with which the network switch computing device 200 can be physically communicationally coupled to one or more other network switch computing devices, general purpose computing devices or other computing devices. The physical network interfaces 271, 272, 273, 274 and 275 can be communicationally coupled to a switch device 210 that can comprise relevant circuitry to enable network communications received via one physical network interface to be transmitted back out of another physical network interface. As will be recognized by those skilled in the art, the switch device 210 can be part of a "forwarding plane" of the network switch computing device 200.

Additionally, the network switch computing device 200 can comprise one or more processing units, such as the exemplary application-specific processing unit 220. In one embodiment, to reduce latency and other delays, network switch computing devices having only a single application-specific processing unit 220 for the entire "forwarding plane" of the network switch computing device 200 can be utilized. In other embodiments, however, as will be recognized by those skilled in the art, network switch computing devices having multiple processing units 220 for the "forwarding plane" can be utilized.

The network switch computing device 200 can also comprise a system memory 230 that can comprise a flow table 231, such as the flow tables that will be described in detail below. In one embodiment, to again reduce latency and other delays, network switch computing devices having content-addressable memory as the system memory 230 can be utilized. As will be recognized by those skilled in the art, such content addressable memory can enable the network switch computing device 200 to access the relevant entries of the flow table 231 in a substantially more efficient manner, thereby enabling the network switch computing device 200 to determine, in a minimum amount of time, how to direct received frames of network communications. The system memory 230, one or more processing units 220 and the switch device 210 can be communicationally coupled to one another through a system bus 240. In embodiments where one or more of the memory 230, processing units 220 and switch device 210 are integrated into single chip, the system bus 240 can be nothing more than the signal pathways among the various components of such a single chip, providing the functionality associated with the memory 230, processing units 220 and switch device 210, and its illustration in FIG. 2 can be nothing more than notational convenience for the purpose of illustration.

Figure 3:
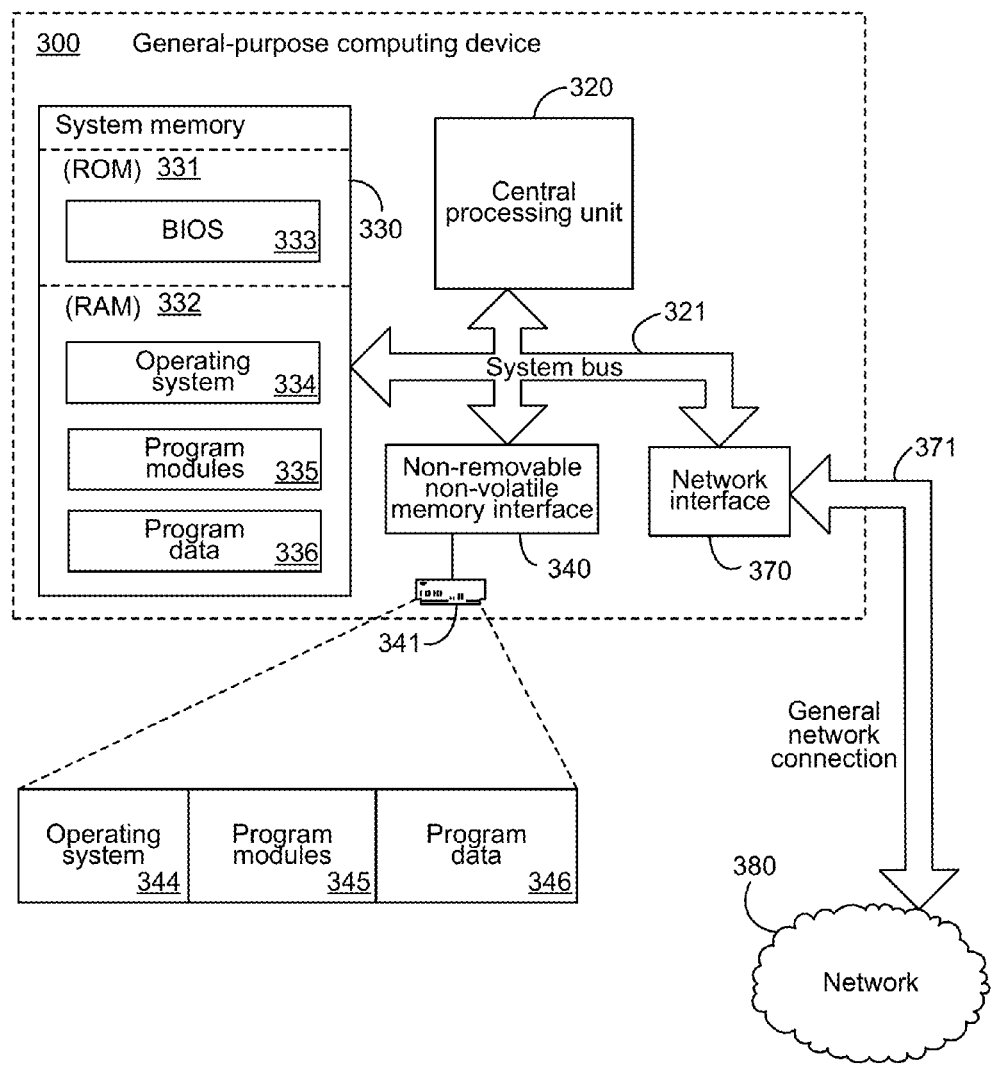
FIG. 3 is a block diagram illustrating an exemplary general purpose computing device.

Turning to FIG. 3, an exemplary general-purpose computing device 300 is illustrated. The exemplary general-purpose computing device 300 can include, but is not limited to, one or more central processing units (CPUs) 320, a system memory 330 and a system bus 321 that couples various system components including the system memory to the processing unit 320. The system bus 321 may be any of several types of bus structures including a memory bus or memory controller, a peripheral bus, and a local bus using any of a variety of bus architectures. Depending on the specific physical implementation, one or more of the CPUs 320, the system memory 330 and other components of the general-purpose computing device 300 can be physically co-located, such as on a single chip. In such a case, some or all of the system bus 321 can be nothing more than communicational pathways within a single chip structure and its illustration in FIG. 3 can be nothing more than notational convenience for the purpose of illustration.

The general-purpose computing device 300 also typically includes computer readable media, which can include any available media that can be accessed by computing device 300. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the general-purpose computing device 300. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the general-purpose computing device 300 may operate in a networked environment via logical connections to one or more remote computers. The logical connection depicted in FIG. 3 is a general network connection 371 to a network 380 that can be a local area network (LAN), a wide area network (WAN) such as the Internet, or other networks. The computing device 300 is connected to the general network connection 371 through a network interface or adapter 370 that is, in turn, connected to the system bus 321. In a networked environment, program modules depicted relative to the general-purpose computing device 300, or portions or peripherals thereof, may be stored in the memory of one or more other computing devices that are communicatively coupled to the general-purpose computing device 300 through the general network connection 371. It will be appreciated that the network connections shown are exemplary and other means of establishing a communications link between computing devices may be used.

The general-purpose computing device 300 may also include other removable/non-removable, volatile/nonvolatile computer storage media. By way of example only, FIG. 3 illustrates a hard disk drive 341 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340.

The drives and their associated computer storage media discussed above and illustrated in FIG. 3, provide storage of computer readable instructions, data structures, program modules and other data for the general-purpose computing device 300. In FIG. 3, for example, hard disk drive 341 is illustrated as storing operating system 344, other program modules 345, and program data 346. Note that these components can either be the same as or different from operating system 334, other program modules 335 and program data 336. Operating system 344, other program modules 345 and program data 346 are given different numbers here to illustrate that, at a minimum, they are different copies.

Figure 4:
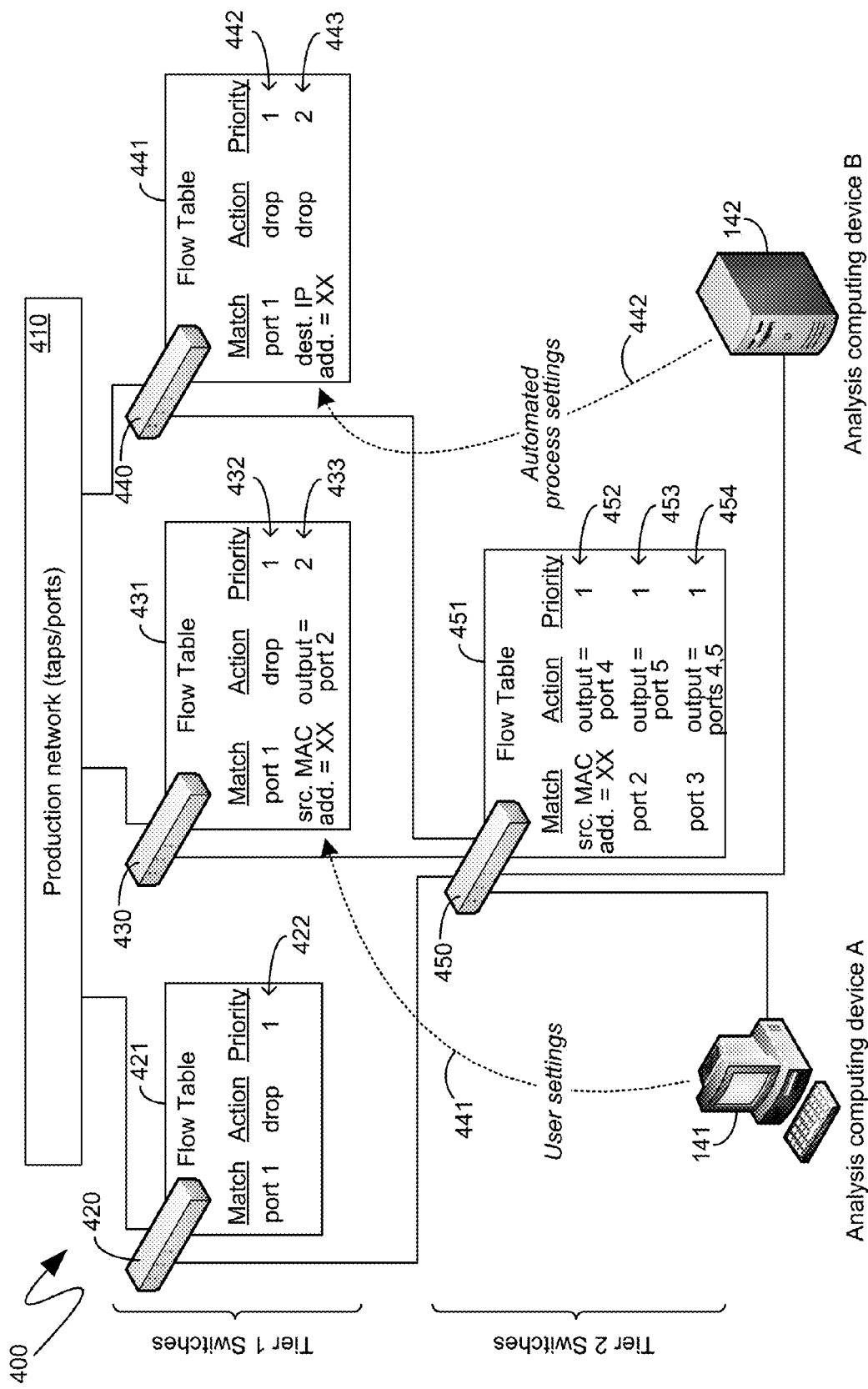
FIG. 4 is another component diagram of an exemplary network comprising an analysis network of ordinary switches.

Turning to FIG. 4, the system 400 shown therein illustrates an exemplary operation of multiple tiers of ordinary network switches being utilized to passively monitor a production network, including a large-scale production network. As indicated previously, an initial tier of switches, such as the switches 420, 430 and 440 that are shown in the exemplary system 400 of FIG. 4, can be communicationally coupled with the production network that is being passively monitored, such as through network taps or ports of existing switching hardware in the production network, thereby receiving an unmodified copy of the frames of such a production network. In the exemplary system 400 of FIG. 4, such network taps and/or ports of production network switches are generally represented by the production network taps and ports 410, to which the initial tier of switches, such as the switches 420, 430 and 440, is communicationally coupled.

As shown in the exemplary system 400 of FIG. 4, each of the switches, such as exemplary switches 420, 430, 440 and 450 can comprise corresponding flow tables, namely the flow tables 421, 431, 441 and 451, that can inform the action that each of those respective switches applies to network frames being received by those switches. As will be recognized by those skilled in the art, techniques exist whereby such flow tables can be modified in accordance with known protocols and standards. Thus, in one embodiment, the ordinary network switches being utilized in the multi-tier passive network monitoring described herein can be compatible with such protocols and standards to enable efficient modification of the flow tables of such switches by, for example, one or more analysis computing devices.

Initially, the flow tables of the switches comprising the initial tier of switches can comprise an entry instructing all of the frames being received by those switches to be dropped. For purposes of illustration, the exemplary switch 420 that is shown in the system 400 of FIG. 4, comprises a flow table 421 that comprises an entry 422 providing such an instruction to the exemplary switch 420. As can be seen from the entry 422, such entries typically comprise information identifying frames, specifying an action to be applied to the identified frames, and specifying a priority at which such an action is to be applied. The exemplary entry 422 can identify all of the frames being received at whichever port of the switch 420 the communicational connection to the production network taps and ports 410 is connected. For purposes of illustration, such a port is shown as "port 1". The exemplary entry 422 can then identify an action of "drop" to be applied to all of the frames from network communications being received on the identified port, and can specify a priority of "1". Absent any entries of higher priority, the exemplary entry 422 in the flow table 421 can cause the exemplary switch 420 to simply drop all of the frames being received by the switch 420 on "port 1". As will be recognized by those skilled in the art, the frames being received by the switch 420 in the first place are copies of frames from the production network and, as such, their dropping, by the switch 420, does not affect any of the network communications of the production network.

To provide passive network monitoring, however, one or more of the switches of the initial tier of switches such as, for example, one or more of the switches 420, 430 and 440 shown in exemplary system 400 of FIG. 4, can comprise a flow table comprising entries that can identify a set of frames that can be of interest to an analyst for whom such passive network monitoring is being performed. For example, the exemplary flow table 431 of the exemplary switch 430 can comprise, not only an entry 432 that can be analogous to the entry 422 described in detail above with reference to the flow table 421 of the exemplary switch 420, but can also comprise an entry 433 that can be directed to a set of frames deemed to be of interest.

More specifically, and as will be recognized by those skilled in the art, production networks can experience issues that it can be desirable to resolve. Such issues can include a slowness of specific communications, an improper delivery of communications, and other like issues. Often, such issues do not affect the entire network, but, instead, are experienced by a limited set of individuals. For example, a user of a production network can report, such as to an administrator, that that user is experiencing slow network traffic. As a consequence, an analyst attempts to determine why network traffic to or from such a user may be unnecessarily slowed down. To do so, as will be understood by those skilled in the art, such an analyst can attempt to examine frames of network communications that are either directed to, or being transmitted by, such a user. Thus, in one embodiment, an entry, such as the entry 433, can be provided to one or more flow tables of one or more switches that comprise the initial tier of switches, and such an entry can operate on those frames, from among the network communications being provided to the initial tier of switches, that can be of interest to such an analyst.

For example, the exemplary entry 433 in the flow table 431 of the switch 430 can specify a source MAC address such that all frames whose headers indicate the specified source MAC address can have the action specified by the entry 433 applied to them by the exemplary switch 430. In particular, and as shown by the exemplary entry 433, one action that can be applied to such a selected set of frames can be to direct those frames to a subsequent tier of switches such as, for example, the exemplary switch 450. For purposes of the exemplary entry 433, the switch 450 is assumed to be communicationally coupled to the switch 430 via the "port 2" of the switch 430. Thus, the exemplary entry 433 comprises an action specification that frames matching the source MAC address specified are to be output out of "port 2". Additionally, the exemplary entry 433 comprises a priority higher than that of the exemplary entry 432, namely a priority of "2" in the present example.

As a result of the higher priority of the exemplary entry 433 than that of the exemplary entry 432, the switch 430 can process the exemplary entry 433 first, before it processes the exemplary entry 432. For example, were a frame to be received, by the switch 430, whose source MAC address was that specified in the exemplary entry 433, then the switch 430 can identify two entries in the flow table 431 that are relevant to such a frame, namely the exemplary entries 432 and 433. As between those two identified entries, the switch 430 can first process the entry with the higher priority, namely the exemplary entry 433. As a result of the processing of the exemplary entry 433, the switch 430 can send the frame that it received from the production network, and whose source MAC address matched that specified in the exemplary entry 433, to the subsequent device connected to the switch 430 at "port 2", namely, in the present example, the subsequent tier switch 450. Having so processed the frame that was received in accordance with the entry 433, the switch 430 need not process the frame further and, consequently, no processing is performed in accordance with exemplary entry 432 for this specific frame. Nevertheless, for other frames received by the switch 430, namely frames whose source MAC address is not that specified in the entry 433, the switch 430 can identify only one relevant entry in the flow table 431, namely the entry 432. That entry, as described above, can instruct the switch to simply drop those frames. Thus, as can be seen, as a result of the exemplary entries 432 and 433 in the flow table 431 of the switch 430, the switch 430 can drop all of the frames it receives, except for those frames matching specific criteria that can be defined by an analyst seeking to address an issue being experienced within the production network, which can be directed, by the switch 430, to a subsequent tier switch, such as the switch 450. In such a manner, the switches in the initial tier of switches can filter the frames of network communications received by those switches to pass along, to subsequent tier switches, those frames that are deemed to be of interest, such as by an analyst establishing such criteria in the first place.

In one embodiment, frames can be identified by the attributes that they possess. For example, the exemplary entry 433 in the flow table 431 identified frames by the source MAC address of those frames. More specifically, only frames matching the source MAC address specified by the exemplary entry 433 can be processed in accordance with the actions defined by the exemplary entry 433. Other attributes by which frames can be identified can include the destination MAC address, the port of the relevant switch, at which such frames were received, the Ethernet type of such frames, the VLAN identifier or priority of such frames, and the source or destination IP addresses of such frames. Yet other attributes by which frames can be identified can include the source or destination UDP, TCP, or other like protocol-defined ports, the IP protocol specified by such frames, and the IP type of service specified by such frames. As will be recognized by those skilled in the art, other identifying attributes can likewise be utilized. For example, in one embodiment, frames can be specifically tagged for examination by the passive network monitoring described in detail above. In such an embodiment a user that is experiencing difficulties with a particular communicational session, for example, can have their host configured to always set, as an example, a DSCP value of 10 when using that problematic communicational session. As will be recognized by those skilled in the art, other attributes can be utilized to tag frames, or other tagging mechanisms can be utilized.

In addition to performing the action specified by, for example, an entry in a flow table, switches, such as the exemplary switches 420, 430 and 440 of the initial tier of switches can also maintain statistical information regarding frames deemed relevant to an entry in their flow tables. For example, returning to the above example, the switch 430 can maintain statistics regarding the frames directed to "port 2" in accordance with the exemplary entry 433 in the flow table 431. Such maintained statistics can include information such as, for example, the total number of frames matching the exemplary entry 433 and acted upon in accordance with that entry by the switch 430, the number of frames per second, on average, that have been received by the switch 430 that match the exemplary entry 433, and other like statistical information. In one embodiment, a switch can maintain such statistical information even if the action performed was to drop the identified frames.

Consequently, if an analyst or an analysis process did not desire the frames themselves, but rather only sought statistical information regarding a defined set of frames, an entry in a flow table could instruct a switch to identify specific frames, but then drop them after they were identified. For example, the flow table 441 of the switch 440 comprises two entries, namely the exemplary entry 442, that can be analogous to the exemplary entries 432 and 422 that were described previously in detail, and another exemplary entry, namely the exemplary entry 443 that can, like the exemplary entry 433, identify and specify a specific set of frames. In the particular case of the exemplary entry 443, the set of frames that is identified are frames comprising a destination IP address equivalent to that specified by the exemplary entry 443. Additionally, as with the exemplary entry 433, the exemplary entry 443 comprises a priority of "2" that can be higher than the priority of "1" of the exemplary entry 442 that is also in the flow table 441. Consequently, as with the exemplary entry 433, frames comprising the destination IP address of that specified in the exemplary entry 443 can be processed first according to the action specified in the exemplary entry 443, before any further processing in accordance with the action specified in the exemplary entry 442 is performed.

However, as can be seen from the system 400 of FIG. 4, the action specified by the exemplary entry 443 is the same drop action as specified by the exemplary entry 442. Nevertheless, as indicated previously, the switch 440, upon receiving frames whose destination IP addresses are those specified by the entry 443, will obtain statistical information regarding such frames including, for example, how many such frames the switch 440 processed, how many frames per second were received, and other like statistical information, even though the switch 440 can then, subsequently, drop those frames. In one embodiment such statistical information can be provided to analysis computing devices, such as the analysis computing devices 141 and 142 shown in the exemplary system 400 of FIG. 4, either directly, or indirectly through other networking hardware such as, for example, subsequent tiers of switches, such as the exemplary switch 450.

In one embodiment, switches of an initial tier of switches, such as, for example, the switches 420, 430 and 440 of the exemplary system 400 of FIG. 4, can add additional information to a frame before directing the frame to subsequent tiers of switches. For example, the exemplary entry 433, described in detail previously, can comprise not only an "output" specification, directing the switch 430 as to where to output frames matching the source MAC address specified by the exemplary entry 433, but can also further comprise another action to be performed on such frames. For example, such an action could encode additional data onto those frames such as, for example, an identification of the switch 430, the port through which such frames were received, or subsequently output, identification of a virtual network, or other like data. The additional data to be encoded onto the frames can be specified as part of the "action" portion of an entry, such as the exemplary entry 433. More specifically, an analyst or analysis process, in establishing an entry, such as the exemplary entry 433, in one or more flow tables of the initial tier of switches, specifying a defined set of frames that is of interest to the analyst or analysis process, can also specify, not only that those frames are output to subsequent tiers of switches, but also that such additional data is appended onto them or encoded in them.

For purposes of illustration, the initial tier of switches shown in the exemplary system 400 of FIG. 4, comprising the switches 420, 430 and 440, is shown in FIG. 4 as having flow tables 421, 431 and 441, respectively, that comprise differing entries. In one embodiment, however, the flow tables of all, or substantially all, of the switches that are in the initial tier of switches can all comprise the same entries. In such a manner, the precise switch that receives some portion of the network traffic of the production network need not be known in advance, since all switches of the initial tier of switches will be able to identify and act upon those frames that an analyst or the analysis process have deemed to be of interest, and have, thus, identified in the relevant entries that have been added to the flow tables of such switches.

As can be seen from the above descriptions, the switches of an initial tier of switches can be configured to drop frames that are not deemed to be of interest for subsequent analysis and can further be configured to act upon frames that are defined by a specific set of one or more identifiers that are deemed to be of interest for subsequent analysis. In particular, one such action can be to output such frames to subsequent tiers of switches, such as the exemplary switch 450 shown in the exemplary system 400 of FIG. 4. In one embodiment, such subsequent tiers of switches, such as the exemplary switch 450, can act to multiplex the frames provided to them, and thereby provide such frames to the relevant analysis computing devices such as, for example, the exemplary analysis computing devices 141 and 142 that are shown in FIG. 4.

As an example, the flow table 451 of the switch 450, which can be part of a subsequent tier of switches, can comprise exemplary entries, such as the exemplary entries 452, 453 and 454 that can direct frames that are received from the switches of the initial tier of switches to the appropriate analysis computing devices. In one embodiment, such direction can be provided simply based on the physical ports at which such frames were received. For example, as illustrated by the exemplary entry 453, frames received on "port 2" of the switch 450 can be directed to "port 5" of the same switch which can comprise, for example, the physical communicational connection to the analysis computing device 142. As another example, as illustrated by the exemplary entry 454, frames received on "port 3" of the switch 450 can be copied by the switch 450 and directed to both "ports 4 and 5" of the switch 450, which can comprise the physical communicational connections to the analysis computing devices 141 and 142, respectively.

In another embodiment, the flow table 451 of the switch 450 of the subsequent tiers of switches can comprise an entry such as the exemplary entry 452 that can specify frames based on other criteria such as, for example, the source MAC address and then direct frames matching such criteria to an appropriate port and, thereby, to an appropriate analysis computing device. As can be seen, switches of the subsequent tier of switches can act as multiplexers receiving information from multiple different sources and then directing such information to multiple different destinations.

As with the entries of the flow tables of the initial tier of switches, the flow tables of the subsequent tiers of switches can, likewise, be set by the analysis computing devices to enable those computing devices, and their human operators, to receive the frames that are deemed to be of interest. In one embodiment, the frame-identifying information that informs the entries of the flow tables of the switches providing the passive network monitoring can be sourced from a human user of, for example, an analysis computing device and the corresponding entries can then be automatically generated in accordance with that human user's input. In another embodiment, however, automated processes executing on the analysis computing device can provide the frame-identifying information that informs the entries of the flow tables. For example, such frame identifying information can be generated by such automated processes in accordance with information previously received by such processes, including information previously received from the ordinary network switches performing the above described passive network monitoring.

Although not specifically illustrated in the system 400 of FIG. 4, in another embodiment, a loop topology could be implemented. For example, a flow table, such as the exemplary flow table 451 of the switch 450 that is part of the second tier of switches could comprise an entry to direct frames back to a switch that is part of the first tier of switches. As another example, a flow table of a switch that is in the first tier of switches, such as, for example, the exemplary flow table 421 of the switch 420, could comprise an entry that directs frames back to the input port of such a switch or of another first tier switch. Similarly, a flow table of a second tier switch could comprise an entry to direct frames back to the input port of such a second tier switch, or another second tier switch. In such a manner, recursive processing of the frames can be performed, with each subsequent recursion further redirecting, filtering, modifying or tagging the frames, as appropriate.

Figure 5:
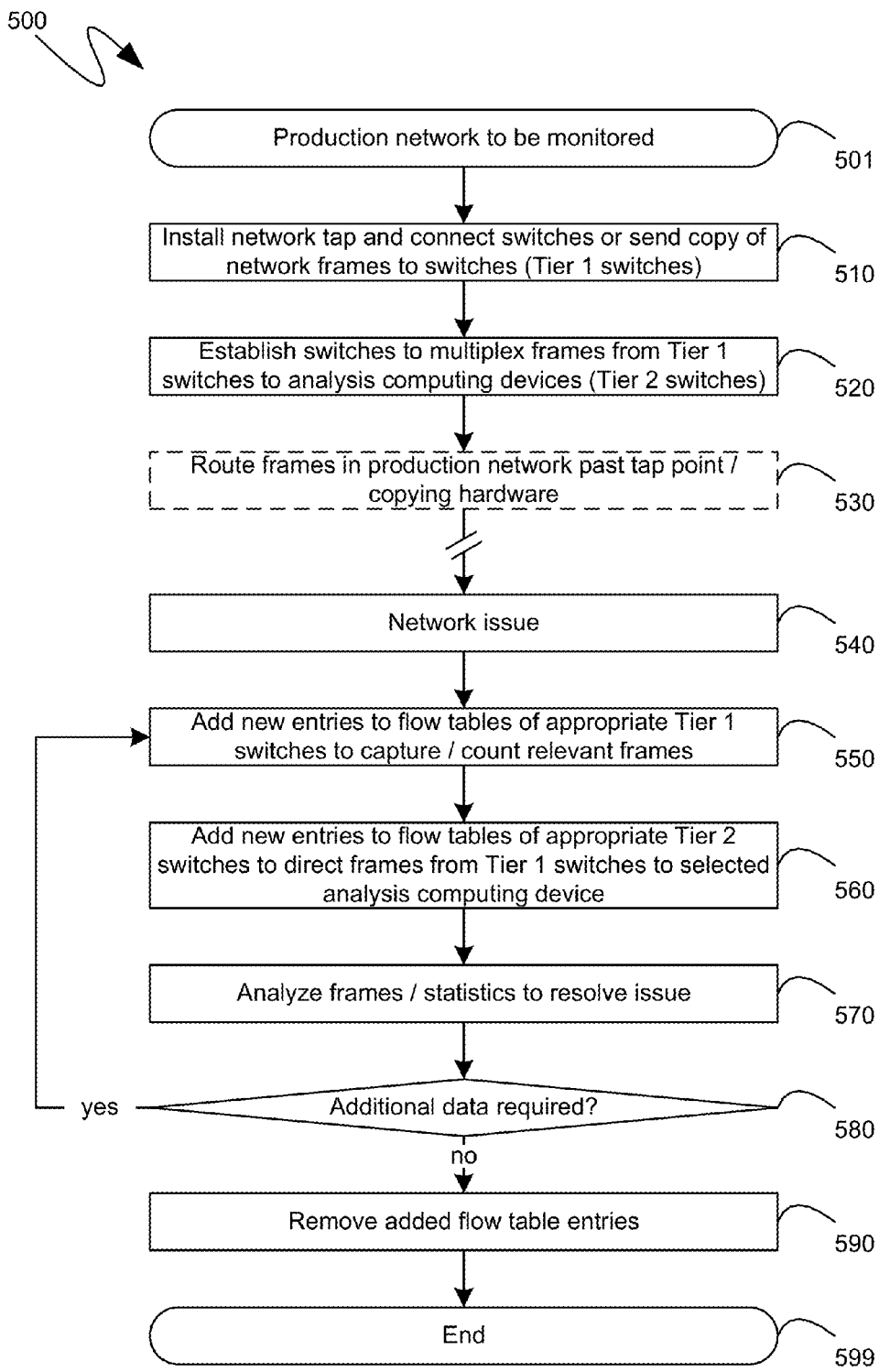
FIG. 5 is a flow diagram of an exemplary operation of an exemplary analysis network of ordinary switches.

Turning to FIG. 5, an exemplary flow diagram 500 is illustrated therein comprising an exemplary series of steps by which passive network monitoring utilizing ordinary network switches can be accomplished. As an initial step, at step 501, a production network to be monitored can be established or identified. Subsequently, at step 510, an initial tier of ordinary network switches can be connected to the production network either via one or more network taps or via the configuration of one or more of the switches of the production network to send copies of frames passing through those switches to the ordinary network switches that comprise the initial tier. At step 520, one or more subsequent tiers of ordinary network switches can be communicationally coupled to the initial tier of switches established at step 510 in order to be able to multiplex frames received from that initial tier of switches to one or more analysis computing devices. As an optional step, at step 530, if the production network of step 501 supports it, network communications in the production network can be routed past the switches that have been configured to copy the frames passing through them in order to provide such frames to the initial tier of switches established at step 510.

Subsequently, at step 540, a network issue can be identified that the multitier passive network monitoring provided by the ordinary network switches established at steps 510 and 520 can aid in troubleshooting. In response to the identification of such a network issue, at step 540, new entries to the flow tables of appropriate initial tier switches can be added at step 550. The entries added to the flow tables, at step 550, can identify those frames that an analyst or an analysis component deemed to be relevant to the network issue identified at step 540. As will be recognized by those skilled in the art, and as explained in detail above, the entries added at step 550 can depend on the network issue identified at step 540. For example, if the network issue identified at step 540 is limited to specific computing devices of the production network then the entries generated at step 550 can identify relevant frames based on IP addresses, MAC addresses, and other like identifiers of the computing devices of the production network that are experiencing the network issue. As another example, as also explained above, the entries added at step 550 can be established in conjunction with tagging that is applied to specific frames to identify those frames for subsequent analysis. Additionally, the entries added to the flow tables of appropriate ones of the initial tier of switches, at step 550, can either instruct those switches to provide the identified frames to subsequent tiers of switches, or can instruct those switches to drop the identified frames and to merely pass along statistical information regarding the identified frames.

At step 560, entries can be added to the flow tables of appropriate ones of the network switches that comprise the subsequent tiers of network switches to provide for the delivery of frames, from the initial tier of network switches in accordance with the entries added at step 550, to appropriate ones of the analysis computing devices. At step 570, the frames or statistical information received by such analysis computing devices can be analyzed to resolve the issue identified at 540.

At step 580, a determination can be made as to whether additional data is required in order to resolve the network issue identified at step 540. If no such additional data is required, then processing can proceed to step 590 where the flow table entries added at steps 550 and 560 can be removed. Subsequently, at step 599, the relevant processing can end. If, however, additional data is found to be required, at step 580, then processing can return to step 550 and can repeat steps 550, 560 and 570, except that the flow table entries added at steps 550 and 560 can be informed by the data that was collected from as a result of a prior round of flow table entries, and which was analyzed during a prior execution of step 570.

As can be seen from the above descriptions, a passive monitoring of a large-scale network utilizing multiple tiers of ordinary network switches has been presented. Which, in view of the many possible variations of the subject matter described herein, we claim as our invention all such embodiments as may come within the scope of the following claims and equivalents thereto.

We claim:

1. A system of ordinary network switches for passively monitoring a separate production network, the system comprising:
    a first tier of one or more ordinary network switches communicationally coupled to the production network so as to receive copies of frames of data being transmitted through the production network, each of the one or more ordinary network switches of the first tier comprising a first flow table comprising a first entry having a first capture priority and identifying all frames received from the production network and a second entry having a second capture priority, that is higher than the first capture priority, and specifying a first criteria, wherein the first and second entries cause the one or more ordinary network switches of the first tier to drop all frames received from the production network except for frames matching the first criteria that is specified by the second entry; and
    a second tier of one or more ordinary network switches differing from the one or more ordinary network switches of the first tier and communicationally coupled to the one or more ordinary network switches of the first tier, each of the one or more ordinary network switches of the second tier comprising a second flow table comprising a third entry that causes the one or more ordinary network switches of the second tier to provide output to a first analysis computing device identified by the third entry;
    wherein the production network directs undropped frames to computing devices to which such frames are addressed, while the first and second tiers of ordinary switches direct undropped frames to computing devices differing from the computing devices to which such frames are addressed.

2. The system of claim 1, wherein the second entry further causes the one or more ordinary network switches of the first tier to also drop all of the frames matching the first criteria.

3. The system of claim 2, wherein the second entry further causes the one or more ordinary network switches of the first tier to collect statistical information about the frames matching the first criteria.

4. The system of claim 3, wherein the third entry specifies a second criteria, and wherein further the one or more ordinary network switches of the second tier send only a portion of the statistical information, collected by the one or more ordinary network switches of the first tier, to the first analysis computing device, the portion being identified by the second criteria.

5. The system of claim 1, wherein the first criteria comprises a destination network address; and wherein further the first and second entries cause the one or more ordinary network switches of the first tier to drop all frames received from the production network except for frames directed to the destination network address.

6. The system of claim 1, wherein the first criteria comprises a host network address; and wherein further the first and second entries cause the one or more ordinary network switches of the first tier to drop all frames received from the production network except for frames sent from one or more computing devices associated with the host network address.

7. The system of claim 6, wherein the first flow table further comprises, in addition to the first and second entries, a fourth entry, the fourth entry having a fourth capture priority that is also higher than the first capture priority, the fourth entry specifying a second criteria that comprises a destination network address being a same network address as the host network address; and
    wherein further the first, second and fourth entries cause the one or more ordinary network switches of the first tier to drop all frames received from the production network except for frames either sent from, or directed to, the one or more computing devices associated with the same network address that is both the host network address of the first criteria and the destination network address of the second criteria.

8. The system of claim 1, wherein the second entry further comprises an identification of at least some of the one or more ordinary network switches of the second tier, the second entry thereby causing the one or more ordinary network switches of the first tier to transmit frames received from the production network and matching the first criteria to the at least some of the one or more ordinary network switches of the second tier.

9. The system of claim 8, wherein the third entry specifies a second criteria, the third entry thereby causing the at least some of the one or more ordinary network switches of the second tier, which received, from one or more ordinary network switches of the first tier, the frames matching the first criteria, to transmit frames matching both the first and second criteria to the first analysis computing device.

10. The system of claim 1, wherein the first flow table further comprises, in addition to the first and second entries, a fourth entry, the fourth entry having a fourth capture priority that is also higher than the first capture priority, the fourth entry specifying a second criteria, wherein the first, second and fourth entries cause the one or more ordinary network switches of the first tier to drop all frames received from the production network except for frames matching either the first or second criteria and to transmit frames matching either the first or second criteria to at least some of the one or more ordinary network switches of the second tier; and wherein further the second flow table further comprises, in addition to the third entry, a fifth entry identifying a second analysis computing device, wherein the third and fifth entries cause the one or more ordinary network switches of the second tier to transmit frames matching the first criteria, received from the one or more ordinary network switches of the first tier, to the first analysis computing device and to transmit frames matching the second criteria, received from the one or more ordinary network switches of the first tier, to the second analysis computing device.

11. The system of claim 1, wherein the third entry identifies the first analysis computing device by identifying a port to which the first analysis computing device is communicationally coupled.

12. A method for creating multiple tiers of ordinary network switches to passively monitor a production network, the multiple tiers of ordinary network switches being separate from the production network, the method comprising the steps of:

communicationally coupling a first tier of one or more ordinary network switches to the production network such that the one or more ordinary network switches of the first tier receive copies of frames of data being transmitted through the production network;

storing, in a flow table of each of the one or more ordinary network switches of the first tier, a first entry having a first capture priority and instructing the one or more ordinary network switches of the first tier to drop each frame received from the production network;

storing, in the flow table of each of the one or more ordinary network switches of the first tier, a second entry having a second capture priority, that is higher than the first capture priority, and specifying a first criteria, wherein the first and second entries cause the one or more ordinary network switches of the first tier to drop all frames received from the production network except for frames matching the first criteria that is specified by the second entry;

communicationally coupling a second tier of one or more ordinary network switches, differing from the one or more ordinary network switches of the first tier, to the one or more ordinary network switches of the first tier;

storing, in a flow table of each of the one or more ordinary network switches of the second tier, a third entry identifying a first analysis computing device, wherein the third entry causes the causes the one or more ordinary network switches of the second tier to provide output to the first analysis computing device; and communicationally coupling the first analysis computing device to the one or more ordinary network switches of the second tier;

wherein the production network directs undropped frames to computing devices to which such frames are addressed, while the multiple tiers of ordinary network switches direct undropped frames to computing devices differing from the computing devices to which such frames are addressed.

13. The method of claim 12, wherein the second entry further causes the one or more ordinary network switches of the first tier to also drop all of the frames matching the first criteria.

14. The method of claim 13, wherein the second entry further causes the one or more ordinary network switches of the first tier to collect statistical information about the frames matching the first criteria.

15. The method of claim 14, wherein the third entry specifies a second criteria, and wherein further the one or more ordinary network switches of the second tier send only a portion of the statistical information, collected by the one or more ordinary network switches of the first tier, to the first analysis computing device, the portion being identified by the second criteria.

16. The method of claim 12, wherein the first criteria comprises a destination network address; and wherein further the first and second entries cause the one or more ordinary network switches of the first tier to drop all frames received from the production network except for frames directed to the destination network address.

17. The method of claim 12, wherein the first criteria comprises a host network address; and wherein further the first and second entries cause the one or more ordinary network switches of the first tier to drop all frames received from the production network except for frames sent from one or more computing devices associated with the host network address.

18. The method of claim 17, wherein the first flow table further comprises, in addition to the first and second entries, a fourth entry, the fourth entry having a fourth capture priority that is also higher than the first capture priority, the fourth entry specifying a second criteria that comprises a destination network address being a same network address as the host network address; and wherein further the first, second and fourth entries cause the one or more ordinary network switches of the first tier to drop all frames received from the production network except for frames either sent from, or directed to, the one or more computing devices associated with the same network address that is both the host network address of the first criteria and the destination network address of the second criteria.

19. The method of claim 12, further comprising:

storing, in the flow table of each of the one or more ordinary network switches of the first tier, a fourth entry, the fourth entry having a fourth capture priority that is also higher than the first capture priority, the fourth entry specifying a second criteria, wherein the first, second and fourth entries cause the one or more ordinary network switches of the first tier to drop all frames received from the production network except for frames matching either the first or second criteria and to transmit frames matching either the first or second criteria to at least some of the one or more ordinary network switches of the second tier; and storing, in a flow table of each of the one or more ordinary network switches of the second tier, a fifth entry identifying a second analysis computing device, wherein the third and fifth entries cause the one or more ordinary network switches of the second tier to transmit frames matching the first criteria, received from the one or more ordinary network switches of the first tier, to the first analysis computing device and to transmit frames matching the second criteria, received from the one or more ordinary network switches of the first tier, to the second analysis computing device.

20. One or more computer-readable storage media comprising computer-executable instructions for passively monitoring a production network, the computer-executable instructions directed to steps comprising:

adding a second entry, having a second capture priority and specifying a first criteria, to flow tables of a first tier of one or more ordinary network switches that are communicationally coupled to the production network so as to receive copies of frames of data being transmitted through the production network, the flow tables already comprising a first entry, having a first capture priority and instructing the one or more ordinary network switches of the first tier to drop each frame received from the production network, wherein the second capture priority is higher than the first capture priority, the first and second entries thereby causing the first tier of one or more ordinary network switches to drop all frames received from the production network except for frames matching the first criteria that is specified by the second entry; and adding a third entry, identifying a first analysis computing device, to flow tables of a second tier of one or more ordinary network switches, differing from the one or more ordinary network switches of the first tier and communicationally coupled to the one or more ordinary network switches of the first tier, wherein the third entry causes the causes the one or more ordinary network switches of the second tier to provide output to a first analysis computing device identified by the third entry;

wherein the production network directs undropped frames to computing devices to which such frames are addressed, while the first and second tiers of ordinary switches direct undropped frames to computing devices differing from the computing devices to which such frames are addressed.

* * * * *